No. 733,513. PATENTED JULY 14, 1903.
A. P. SMITH, Jr.
ROLLER CHAFE IRON.
APPLICATION FILED MAR. 28, 1903.
NO MODEL.
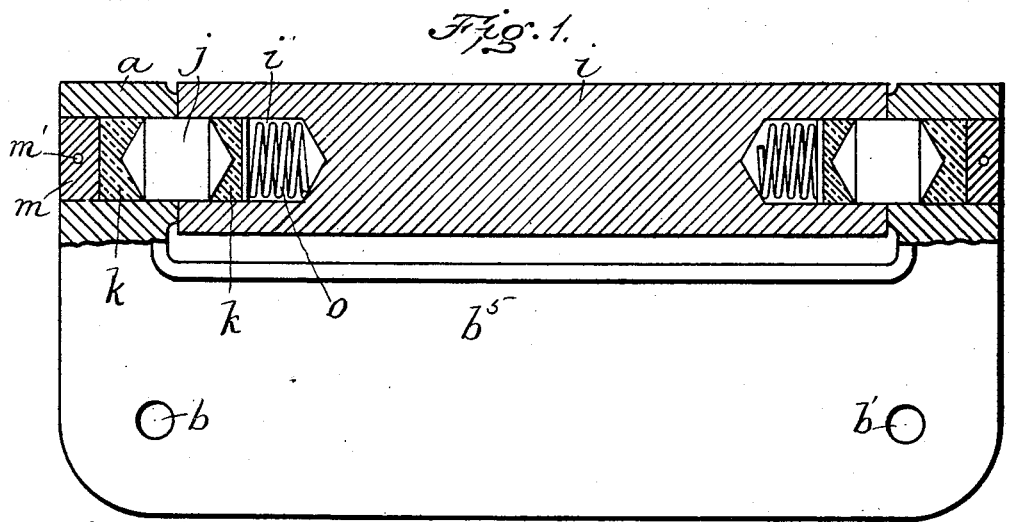
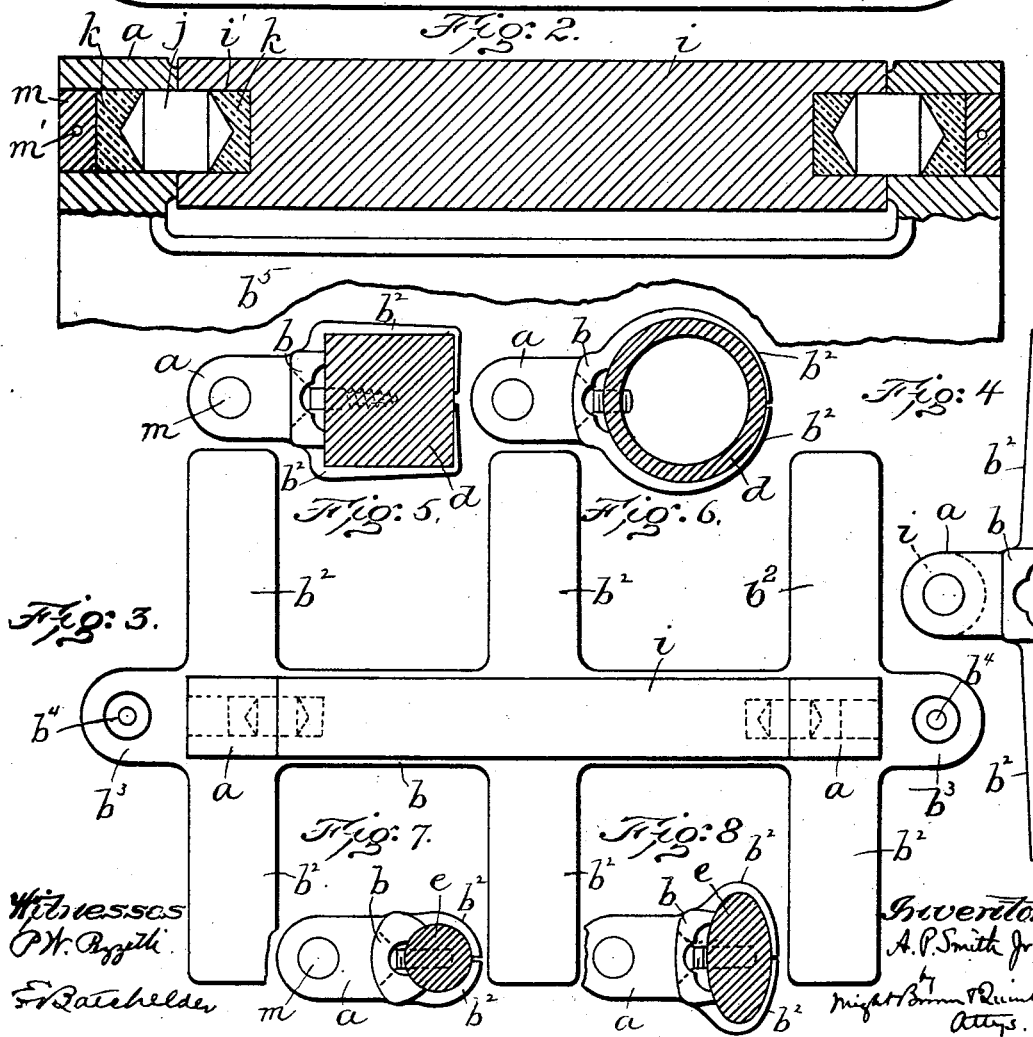

No. 733,513. Patented July 14, 1903.

UNITED STATES PATENT OFFICE.

ALBA PARKER SMITH, JR., OF BROCKTON, MASSACHUSETTS, ASSIGNOR TO SPECIALTY MANUFACTURING COMPANY, OF BOSTON, MASSACHUSETTS, A CORPORATION OF MAINE.

ROLLER CHAFE-IRON.

SPECIFICATION forming part of Letters Patent No. 733,513, dated July 14, 1903.

Application filed March 28, 1903. Serial No. 149,941. (No model.)

*To all whom it may concern:*

Be it known that I, ALBA PARKER SMITH, Jr., of Brockton, in the county of Plymouth and State of Massachusetts, have invented certain new and useful Improvements in Roller Chafe-Irons, of which the following is a specification.

This invention relates to that class of chafe-irons for vehicles in which the wearing portion with which the wheel of the vehicle comes in contact is rotatably mounted, so that it will be in rolling contact with the wheel-tire.

The invention has for its object, first, to provide simple and effective means for attaching the frame or holder in which the rotary roller or acting portion of the iron is journaled to any suitable part of a carriage, such as a reach or a brace.

The invention also has for its object to provide improved means for connecting the roller with its holder in such manner as to insure free rotation of the roller without liability of destruction by rust, &c., and without noise.

To these ends the invention consists in the improvements which I will now proceed to describe and claim.

Of the accompanying drawings, Figure 1 represents a longitudinal section of a roller chafe-iron and its bearings embodying my invention, together with a plan view of an attaching base or ear suitable for attachment to the body portion of a wagon or carriage. Fig. 2 represents a view similar to Fig. 1, omitting the springs. Fig. 3 represents a plan view of a roller chafe-iron and its holder embodying my invention, the holder being adapted for attachment to a reach or brace below a wagon or carriage body. Fig. 4 represents an end elevation of the construction shown in Fig. 3. Figs. 5, 6, 7, and 8 are end elevations of the construction shown in Figs. 3 and 4, representing the holder attached to parts of a carriage.

The same reference characters indicate the same parts in all the figures.

In the drawings, $a\ a$ represent ears formed on an attaching-plate. Said plate, which is indicated by the reference-letter $b^5$ in Figs. 1 and 2 and by the reference-letter $b$ in Figs. 3 to 8, may be adapted for attachment to a flat surface, such as the bottom of a wagon or carriage body, or to a bar or rod, such as a reach or brace below the body. The plate $b^5$ is adapted for application to a flat surface and has screw-holes $b'\ b'$, adapted to receive attaching-screws. The ears and attaching-plate are preferably integral and made of steel by the process of drop-forging, although, if preferred, the attaching-plate $b^5$ and ears $a$, formed as shown in Figs. 1 and 2, may be formed by casting. The plate $b$ (shown in Figs. 3 to 8, inclusive) is provided with integral arms $b^2$, extending in pairs from its opposite edges, there being preferably three pairs of arms, as shown in Fig. 3. These arms are made of malleable or flexible metal and are relatively thin and preferably tapered from their inner to their outer ends, as shown in Fig. 4, so that they may be readily bent around a reach $d$, as shown in Figs. 5 and 6, or around a brace $e$, as shown in Figs. 7 and 8. Fig. 5 shows a reach which is square in cross-section, while Fig. 6 shows a cylindrical reach. Fig. 7 shows a brace which is cylindrical in cross-section, while Fig. 8 shows a brace having an elliptical cross-section.

$b^3\ b^3$ represent ears formed on the ends of the plate $b$, the said ears having orifices $b^4$ for the reception of attaching-screws, whose object is to prevent endwise displacement of the device. It will be seen, therefore, that provision is made for securely attaching the device to a reach or brace, the arms $b^2$ preventing the plate $b$ and the parts supported thereby from being moved outwardly from the reach or brace, while the attaching-screws in the ears $b^3$ prevent any endwise movement.

$i$ represents the rotary chafe-iron, the same being formed as a roller, so connected with the ears $a\ a$ that it will be rotated freely by contact of a wheel-tire with its periphery. The said roller is a cylindrical body, preferably of iron or steel, having recesses $i'\ i'$ in its end portion, said recesses coinciding with corresponding apertures in the ears $a\ a$.

$j\ j$ represent cylindrical studs or trunnions, which are inserted partly in the recesses in the roller $i$ and partly in the orifices in the ears $a$, the said studs having conical ends and being loosely connected with both the ears and the roller.

$k$ $k$ represent disks or washers of yielding material, such as leather, in contact with the ends of the studs $j$, one of said washers being interposed between the inner end of the stud and the inner end of the recess $i'$, while the other washer is interposed between the outer end of the stud and a plug $m$, inserted in the ear $a$ and secured therein by a pin $m'$. The said studs are adapted to rotate loosely in the parts in which they are inserted, so that in case rust forms on their surfaces during a period of disuse of the vehicle the coating of rust will be worn off by the first rotation of the roller $i$. I have found that the studs $j$, loosely connected both with the ears $a$ and the roller $i$, are much less liable to be stuck or impeded by rust than would be the case if the studs were rigidly secured either to the ears $a$ or to the roller $i$. The washers $k$ render the rotation of the studs $j$ noiseless.

As above stated, the studs $j$ are each loosely mounted in the ears and roller, thereby forming an independently-rotatable part at each end of the roller, said part forming the sole support for the roller. Furthermore, by extending the openings or orifices entirely through the ears the roller may be formed of a length to extend closely to the ears, the roller being mounted by being passed between the ears, the studs, &c., being inserted through the ends.

In Fig. 1 I show springs $o$ $o$ in the recesses $i'$, said springs exerting outward pressure on the washers $k$ in said recesses.

I claim—

1. A roller chafe-iron comprising a supporting-plate having ears, said ears containing orifices, a roller having recesses in its ends coinciding with said orifices, a stud loosely inserted in each of said orifices and recesses, said studs providing independent rotatable parts which form the sole support for the roller, washers at the ends of the studs, retaining-plugs in the outer portions of the orifices, and springs located in said recesses.

2. A roller chafe-iron comprising a supporting-plate having flexible laterally-extending arms adapted to extend above and below and to the rear of a vehicle-bar, and having forwardly-projecting ears, and a roller supported in said ears, the plate being adapted to receive attaching-screws.

In testimony whereof I have affixed my signature in presence of two witnesses.

ALBA PARKER SMITH, JR.

Witnesses:
A. C. RATIGAN,
R. BULLOCK.